United States Patent
Ino

(10) Patent No.: US 6,556,257 B2
(45) Date of Patent: *Apr. 29, 2003

(54) LIQUID CRYSTAL DISPLAY DEVICE

(75) Inventor: Masumitsu Ino, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 07/939,720

(22) Filed: Sep. 2, 1992

(65) Prior Publication Data

US 2002/0057397 A1 May 16, 2002

(30) Foreign Application Priority Data

Sep. 5, 1991 (JP) .......................... P03-226206
Mar. 6, 1992 (JP) .......................... P04-084538

(51) Int. Cl.$^7$ .................. G02F 1/136; H01L 31/036
(52) U.S. Cl. ............................... 349/43; 257/72
(58) Field of Search ................... 349/41, 42, 51, 349/138, 129, 143; 257/59, 72

(56) References Cited

U.S. PATENT DOCUMENTS

| | | | | |
|---|---|---|---|---|
| 4,543,133 A | * | 9/1985 | Mukai .......................... 148/1.5 |
| 4,693,759 A | * | 9/1987 | Noguchi et al. ............... 437/24 |
| 4,723,838 A | * | 2/1988 | Aoki et al. | |
| 4,759,610 A | * | 7/1988 | Yanagisawa ................. 350/334 |
| 4,821,092 A | * | 4/1989 | Noguchi ....................... 359/59 |
| 4,869,576 A | * | 9/1989 | Aoki et al. .................... 359/59 |
| 4,889,411 A | * | 12/1989 | Parks et al. .................... 359/59 |
| 4,907,861 A | * | 3/1990 | Muto ............................. 359/59 |
| 4,997,262 A | * | 3/1991 | Sakono et al. ................. 359/59 |
| 5,026,143 A | * | 6/1991 | Tanaka et al. ................. 359/59 |
| 5,060,036 A | * | 10/1991 | Choi ............................. 359/59 |
| 5,121,236 A | * | 6/1992 | Ukai et al. .................... 359/59 |
| 5,148,301 A | * | 9/1992 | Sawatsubashi et al. ....... 359/80 |
| 5,153,702 A | * | 10/1992 | Aoyama et al. .............. 359/59 |
| 5,173,753 A | * | 12/1992 | Wu ............................. 257/347 |
| 5,173,791 A | * | 12/1992 | Strathman et al. ............ 359/59 |
| 5,185,601 A | * | 2/1993 | Takeda et al. ................ 359/59 |
| 5,200,847 A | * | 4/1993 | Mawatari et al. ............. 359/59 |
| 5,247,289 A | * | 9/1993 | Matsueda ..................... 359/59 |
| 5,250,931 A | * | 10/1993 | Misawa et al. ................ 359/59 |
| 5,270,845 A | * | 12/1993 | Sakamoto et al. ............ 359/59 |
| 5,289,016 A | * | 2/1994 | Noguchi ....................... 359/59 |
| 5,317,432 A | * | 5/1994 | Ino ............................... 257/72 |
| 5,392,143 A | * | 2/1995 | Akiyama et al. .............. 359/59 |
| 5,401,685 A | * | 3/1995 | Ha ............................. 437/160 |
| 5,477,355 A | * | 12/1995 | Sasaki et al. ................. 349/42 |
| 2002/0057397 A1 | * | 5/2002 | Ino ............................... 349/59 |

FOREIGN PATENT DOCUMENTS

JP 2-124536 * 5/1990 .................. 359/54

* cited by examiner

Primary Examiner—Robert H. Kim
Assistant Examiner—Dung Nguyen
(74) Attorney, Agent, or Firm—Sonnenschein, Nath & Rosenthal

(57) ABSTRACT

A liquid crystal display device of the monolithic type which comprises a first substrate, a plurality of display elements arranged in a matrix on the first substrate to define a display area of the liquid crystal display device, each of the display elements comprising a picture element or pixel electrode and a switching or pixel transistor associated with the picture element or pixel electrode, a driving circuit formed on the first substrate and connected to the display area. The driving circuit includes a horizontal driver and a vertical driver. The device further includes a second substrate substantially entirely opposed to the first substrate, and a liquid crystal layer disposed between the first and second substrates. A passivation layer is provided to cover the display area or pixel transistors and driving circuit.

9 Claims, 20 Drawing Sheets

(PSG PROTECTIVE FILM USED)

| PICTURE ELEMENT PORTION | THIN FILM TRANSISTOR (SOURCE — DRAIN) | C_S PORTION |

(SIN PROTECTIVE FILM NOT FORMED)

LIQUID CRYSTAL DISPLAY DEVICE

BACKGROUND OF THE INVENTION

1. Field of the Invention

This invention relates to a monolithic liquid crystal display device of the active matrix type which has a thin film transistor drive circuit in a liquid crystal cell and more particularly, to a passivation structure of a thin film transistor in the liquid crystal display device.

2. Description of the Prior Art

A known liquid crystal display device is first described. FIG. 21 schematically shows a known liquid crystal display device which includes a horizontal drive 4 and a vertical driver 5, each formed with a thin film transistor (TFT), outside a liquid cell unit U. The liquid cell unit U alone is so arranged that a liquid crystal layer (not shown) is sealed in a spacer 16 sandwiched between an upper substrate 14 and a lower substrate 15 which are opposed to each other. In other words, the lower substrate 15 serving as a substrate for the TFT's is made larger in size than the upper substrate 14 to define a marginal substrate portion on which the peripheral drivers 4 and 5 are mounted.

In this arrangement where the drive circuits 4, 5 having TFT are mounted outside the liquid crystal cell unit U, it is necessary to form a protective layer made of SiN on the TFT portion of the drive circuits so as to protect the TFT portion from moisture and movable ions such as sodium ions.

On the other hand, within the liquid crystal cell, there are used polyimide resins as an orienting agent, so that it is essential to use a TFT transistor protective insulating film, made of a silicon dioxide compound, on picture elements.

When a SiN-based insulating film is used as the protective film instead of the $SiO_2$-based compound within the liquid crystal cell, the adhesiveness and uniformity of the polyimide orientation film are disadvantageously impeded. As a result, the orientation of the liquid crystal is in turn impeded. In addition, when the SiN-based protective layer is formed on the upper portion of the TFT transistor, the film stress left in the SiN layer will undesirably change the transistor characteristics, e.g. the $V_{TH}$ characteristic is shifted.

Japanese Patent Publication No. 2-61032 proposes a liquid crystal display device which has drive circuits built in a liquid crystal cell. This liquid crystal display device is not defined with respect to the type of material for the passivation film to protect thin film transistors therewith. Thus, the problem involved in the SiN insulating film is still left.

In the monolithic type of liquid crystal display device set forth hereinabove, thin film transistors are constituted of polysilicon and contain grain boundaries. At the grain boundaries, trapping levels are so high that carriers are trapped. By the trapping, the boundaries are charged to form a barrier potential to impede transport of the carriers. Accordingly, the mobility of the carriers in the polycrystals becomes low, making it difficult to obtain a satisfactory on-current. Carriers are generated/re-combined through the trap level at the grain boundary, so that the polysilicon transistor has a high leakage current.

In order to improve electric characteristics of the polysilicon transistor, hydrogenation has been hitherto made. Hydrogen atoms introduced through the hydrogenation are diffused into grain boundaries and bonded to dangling bonds, with the result that the tap density becomes small with a low barrier potential. Accordingly, the mobility of the carriers in the polysilicon transistor becomes high, thereby increasing the on-current. The reduction of the trap level results in the leakage current being suppressed. In addition, part of the introduced hydrogen atoms bonds with an interfacial level at the boundary between the polysilicon and a gate oxide film, thereby causing the threshold voltage of the transistor to be lowered.

In general, hydrogenation is effected by utilizing a passivation film made of silicon nitride. Silicon nitride contains a large amount of hydrogen and serves as a favorable hydrogen source. After formation of a thin film transistor, a silicon nitride protective film is formed and annealed. By the annealing, the hydrogen atoms are diffused into the polysilicon thin film. When the silicon nitride film which has been hydrogenated is left as it is as a passivation layer, there is produced a disadvantage in that the silicon nitride film has a high residual stress, bringing about a significant variation in electric characteristics and particularly a threshold voltage of the thin film transistor. Moreover, when a liquid crystal orienting film such as polyimide is directly formed on the silicon nitride protective film, a disadvantage is involved in that the adhesion between the orienting film and the silicon nitride protective film is not good, resulting in poor uniformity of the orienting film. In addition, when a pair of the substrates are bonded to assemble a liquid crystal cell while leaving the silicon nitride protective film, there is not obtained a satisfactory adhesion strength.

SUMMARY OF THE INVENTION

It is accordingly an object of the invention to provide a liquid crystal display device which overcomes the disadvantages of the prior art liquid crystal display devices without use of any SiN protective film for TFT.

It is another object of the invention to provide a liquid crystal display device of the type which has a TFT lower substrate and an upper substrate substantially entirely opposed to each other wherein thin film transistors on the lower substrate are covered with a passivation layer made of an oxide film thereby ensuring stable transistor characteristics.

It is a further object of the invention to provide a liquid crystal display device of the above-mentioned type wherein a passivation layer made of an oxide film and a silicon nitride layer which is selectively formed on thin film transistors and wiring layers is formed whereby the thin film transistor characteristics are prevented from degradation effectively and breakage of the wiring layers is also prevented.

In accordance with one embodiment of the invention, there is provided a liquid crystal display device which comprises:

a first substrate;

a plurality of display elements arranged in a matrix on the first substrate to define a display area of the liquid crystal display device, each of the display elements comprising a picture element electrode and a switching transistor associated with the picture element electrode;

a driving circuit form on the first substrate and connected to the display area, the driving circuit comprising a horizontal driver and a vertical driver;

a second substrate substantially entirely opposed to the first substrate; and a liquid crystal layer disposed between the first and second substrates.

In accordance with another embodiment of the invention, there is also provided a liquid crystal display device which comprises:

a first substrate;

a plurality of display elements arranged in a matrix on an inner surface of the first substrate, each of the display elements comprising a pixel electrode and a pixel transistor associated with the pixel electrode;

driver means formed directly on the first substrate and connected to the display elements, the driver means including thin film transistors;

a second substrate opposed to the first substrate and having an electrode on an inner surface thereof;

a passivation layer disposed over the pixel transistors and the thin film transistors; and a liquid crystal layer disposed between the first and second substrates.

DETAILED DESCRIPTION AND EMBODIMENTS OF THE INVENTION

A liquid crystal display device according to one embodiment of the invention is described with reference to the accompanying drawings and particularly FIGS. 1 to 3.

Figure 1:
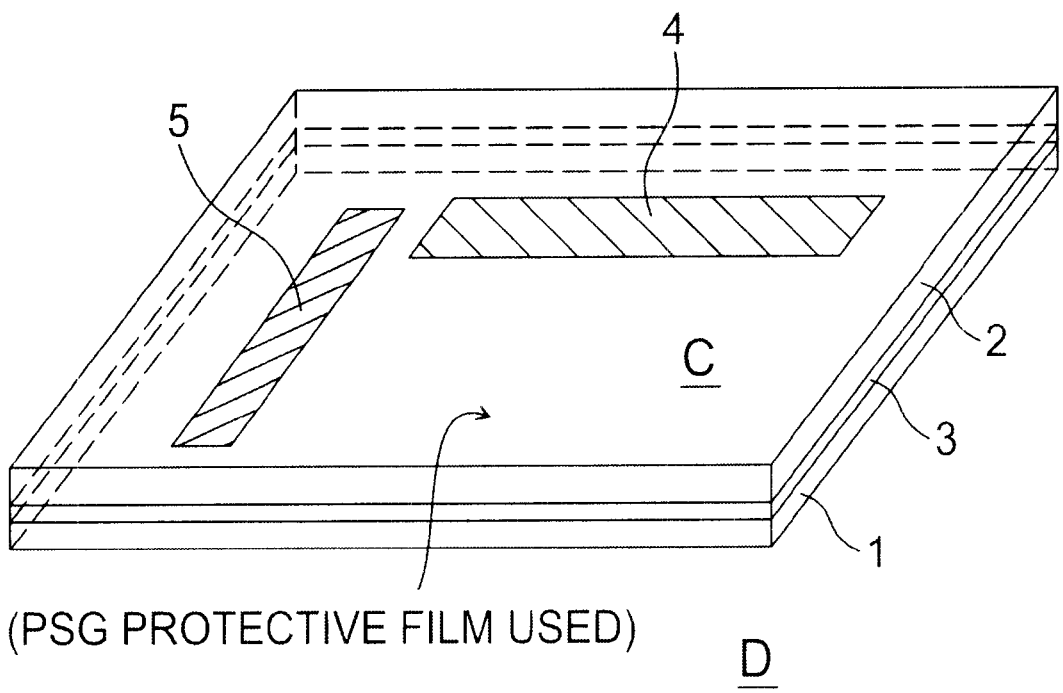
FIG. 1 is a schematic perspective view of a liquid crystal display device according to one embodiment of the invention.

FIG. 1 shows a liquid crystal display device D according to one embodiment of the invention. The device D includes an active matrix substrate 1 which serves as a lower substrate on which a thin film transistor is formed as an active switching element, and an upper substrate 2 opposed substantially entirely opposed to the active matrix substrate 1. A liquid crystal layer sealed in a spacer 3 is disposed between the substrates 1, 2. Moreover, a horizontal (scanning line) drive circuit 4 and a vertical (signal line) drive circuit 5 are formed on the active matrix substrate 1 and built in a liquid crystal cell C.

The liquid crystal display device of the invention has an insulating film made of a silicon oxide compound such as PSG as will be described in more detail in FIG. 2. The insulating film is a passivation film for protecting the transistors. In this connection, it will be noted that the liquid crystal layer contributes to protection of the transistors.

Figure 2A:
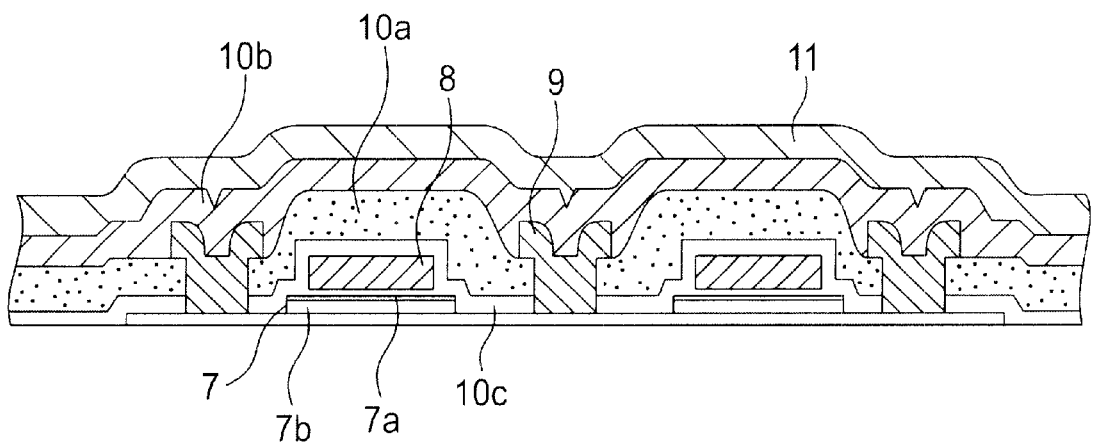
FIGS. 2a and 2b are, respectively, partial sectional views of a drive circuit and a picture element switch of the liquid crystal display device of the invention shown in FIG. 1.
Figure 2B:
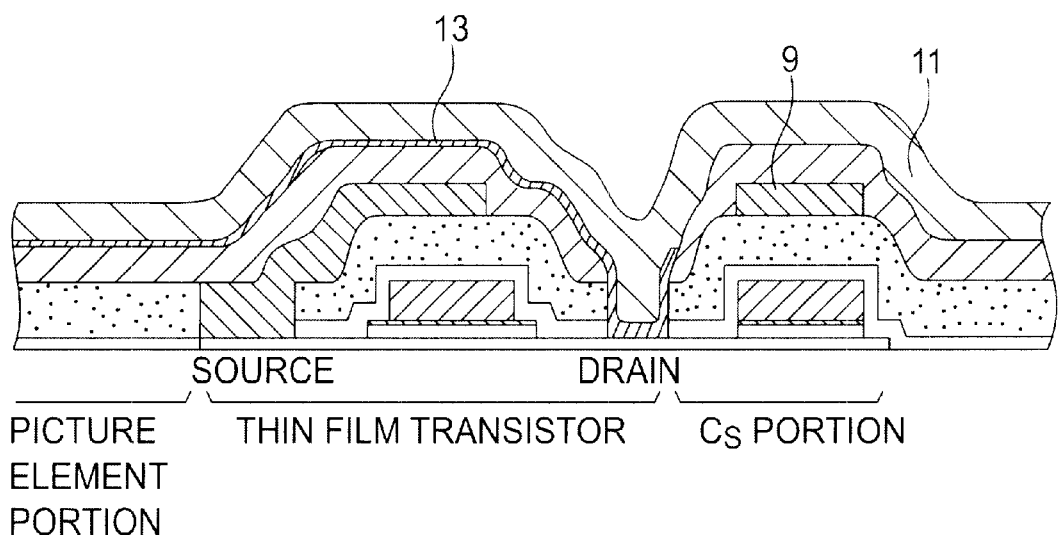

FIGS. 2a and 2b are, respectively, partial, sectional views of the drive circuit portion and a picture element switching portion of the liquid crystal display device shown in FIG. 1.

The drive circuit shown in FIG. 2a is a CMOS unit which includes a gate insulating film 7 including a sub-layer 7a made, for example, of SiN and a sub-layer 7b made, for example, of $SiO_2$. A polysilicon gate 8 is formed on the insulating film 7. The CMOS unit further includes an Al electrode 9, PSG protective layers 10a, 10b, a PSG insulating film 10c and a polyimide orientation film 11 as shown in the figure.

The picture element switch shown in FIG. 2b is constituted of a picture element portion, a thin film transistor (TFT) Portion and a storage capacitor (Cs) portion. In FIGS. 2a and 2b, like reference numerals indicate like parts or members unless otherwise indicated.

In FIG. 2b, a picture element electrode 13 is made, for example, of ITO (indium tin oxide) and is connected to a drain region of TFT. As shown in FIGS. 2a and 2b, the transistors of the drive circuit of the liquid crystal display device of the invention are covered with a silicon oxide PSG film on the upper surface thereof. In addition, the liquid crystal layer has a function of inhibiting moisture and movable ions from entering and can thus serve as a protective layer.

Figure 3:
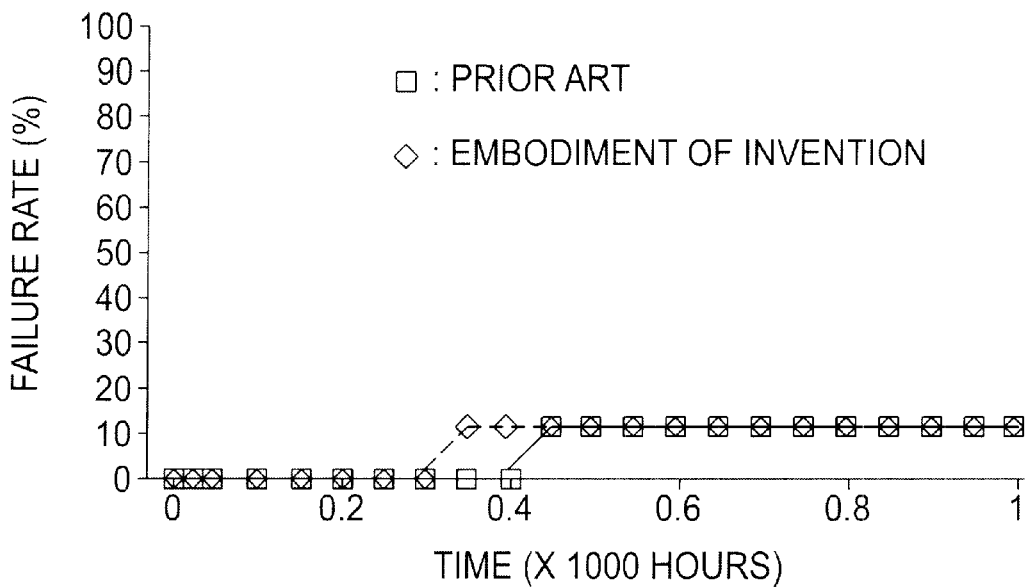
FIG. 3 is a graph showing a trouble rate of a drive circuit in a prior art device and in a liquid crystal display device of the invention.

FIG. 3 shows the results of evaluation of reliability of a drive circuit of a known device wherein the drive circuit is provided outside a liquid crystal cell and SiN is used as a protective layer and of the drive circuit of the invention set out above.

The reliability of the drive circuit was determined according to a high temperature operation test. The test was effected at a temperature of 85° C. at a drive potential higher by 10% than a rating voltage. As will become apparent from the figure, the reliability of the drive circuit of the invention is similar to that of the prior art device.

The fabrication process of the liquid crystal display device of the invention is described with reference to FIGS. 4 to 30.

Figure 4:
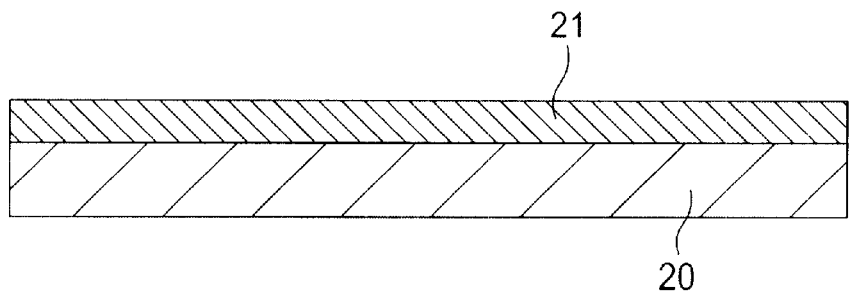
FIGS. 4 to 20 are schematic views showing a fabrication sequence of a liquid crystal display device according to the invention as shown in FIG. 1.

As shown in FIG. 4, there is provided a quartz substrate 20 on which a first polysilicon layer 21 is formed in a thickness of 80 nm according to a low pressure CVD process, followed by implantation of silicon ions ($Si^+$) and solid growth annealing at a temperature of 620° C. The implanting conditions of $Si^+$ include a first cycle of 30 KeV and $1\times10^{15}/cm^2$ and a second cycle of 50 KeV and $1\times10^{15}/cm^2$.

Figure 5:
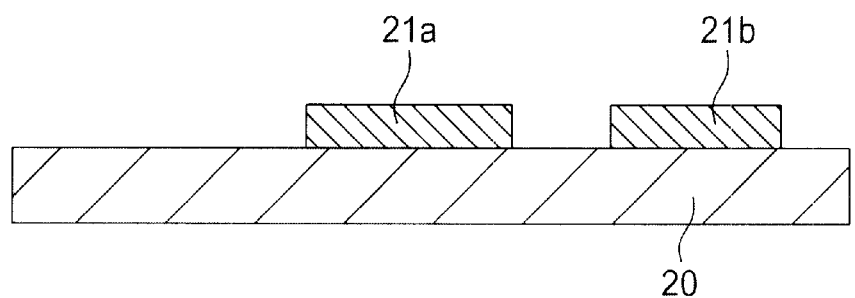

Thereafter, as shown in FIG. 5, the polysilicon layer is etched by lithography to form first polysilicon regions 21a, 21b.

Figure 6:
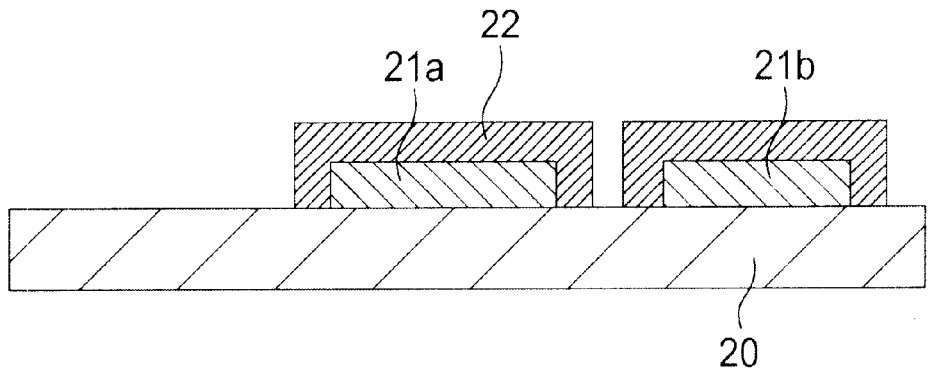

A 50 nm thick $SiO_2$ gate insulating film 22 is then formed on each polysilicon region by a thermal oxidation procedure as shown in FIG. 6.

Figure 7:
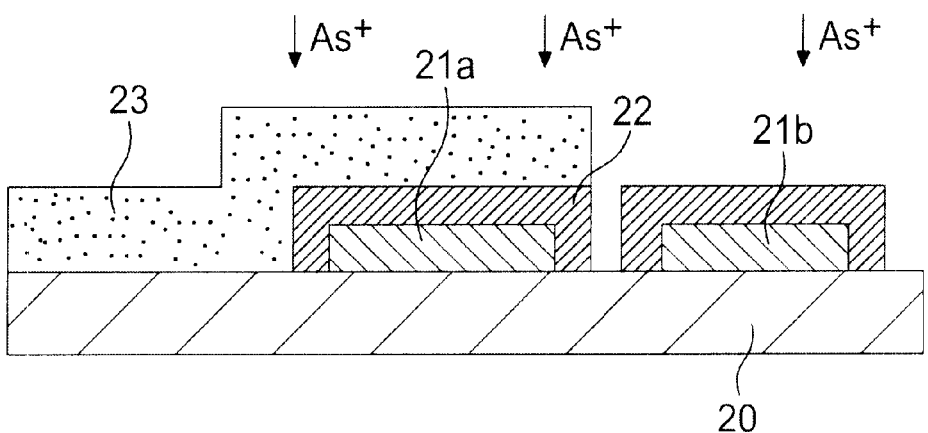
Figure 8:
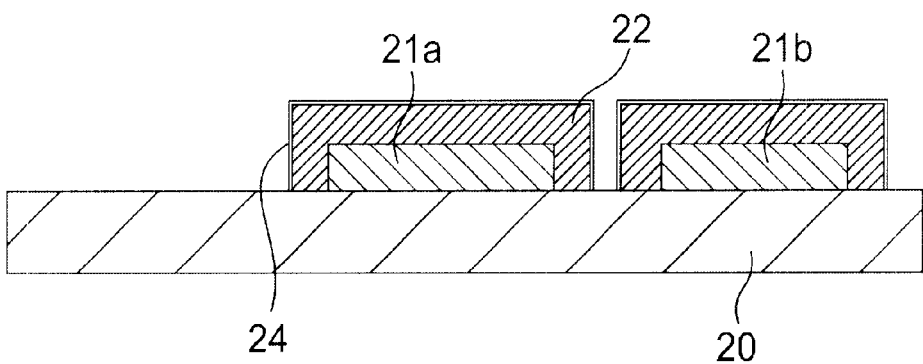

Subsequently, as shown in FIG. 7, a resist 23 is provided as a mask and the first polysilicon region 21a of a storage capacitor, Cs, is implanted with arsenic ions ($As^+$) under conditions of 30 KeV and $5\times10^{14}/cm^2$.

After removal of the resist 23, a 30 nm thick SiN film is formed by a low pressure CVD procedure. After etching part of the SiN film, a SiN gate insulating film 24 was formed on the $SiO_2$ gate insulating film 22.

Figure 9:
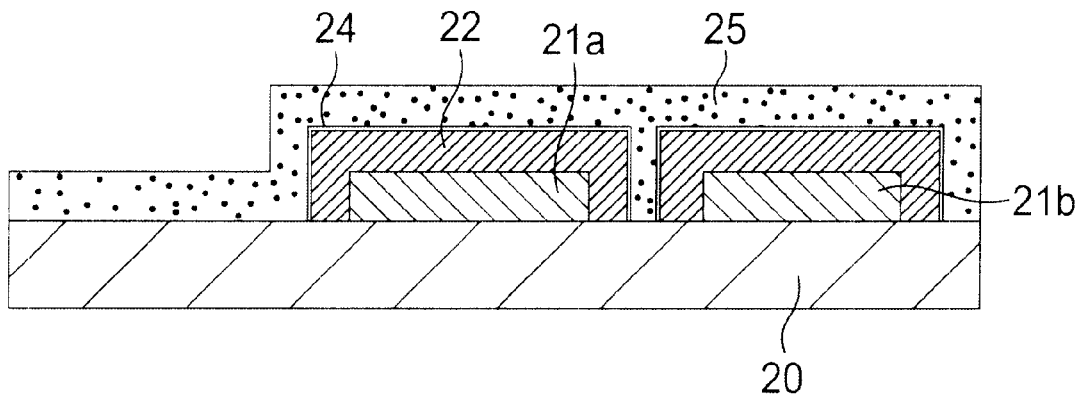

As shown in FIG. 9, a second polysilicon layer 25 is formed in a thickness of 250 nm by a low pressure CVD procedure, followed by rendering the second polysilicon layer 25 small in resistance by the use of PSG.

As shown in FIG. 9, a second polysilicon layer 25 is formed by a low pressure CVD procedure in a thickness of 350 nm, followed by rendering the resistance of the second polysilicon layer 25 low by the use of PSG.

Figure 10:
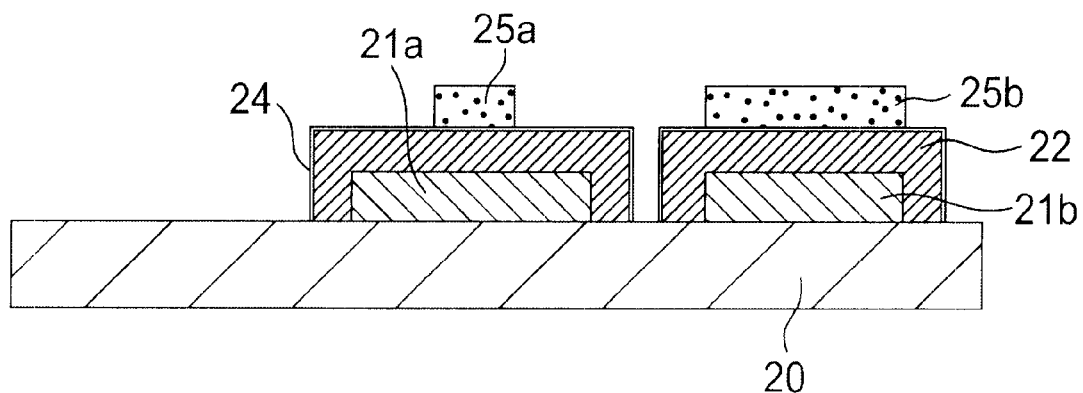

Thereafter, the layer 25 is subjected to patterning by plasma etching to form second polysilicon regions 25a, 25b on the SiN gate insulating film 24 as shown in FIG. 10. Etching gases for this include $CF_4$ and $O_2$ mixed at a ratio of 95/5.

Figure 11:
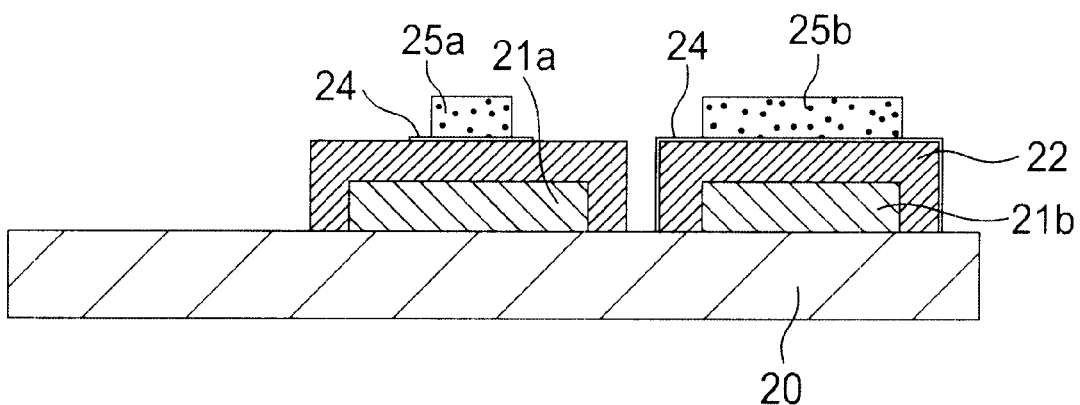

Then, as shown in FIG. 11, part of the SiN gate insulating film 24 of the TFT is partially removed by etching and As ions ($As^+$) are implanted over the entire surface under conditions of 100 KeV and $1\times10^{13}/cm^2$. Moreover, As ions ($As^+$) are implanted at the transistor side under conditions of 140 KeV and $2\times10^{15}/cm^2$ to make an N-channel.

Figure 12:
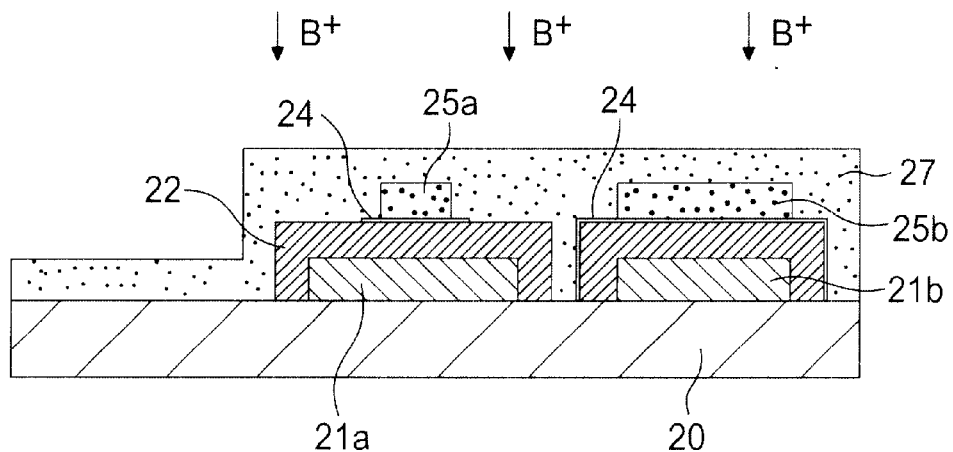

After application of a resist 27 as shown in FIG. 12, boron ions ($B^+$) are implanted under conditions of 30 KeV and $2\times10^{15}/cm^2$ to make a P channel.

Figure 13:
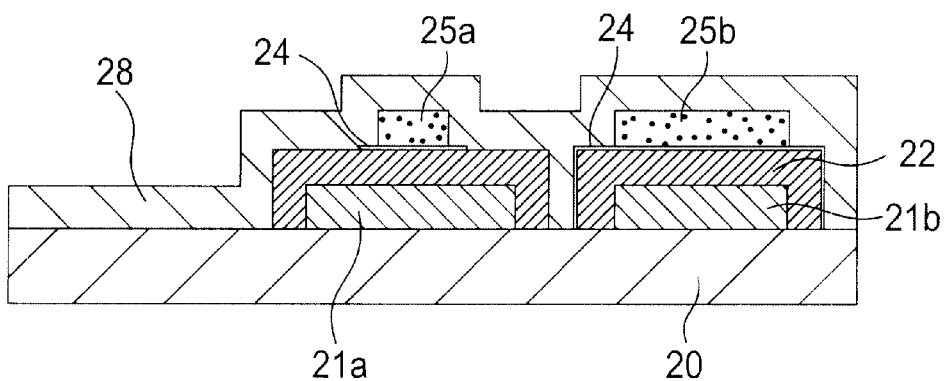

After removal of the resist 27, there is formed an insulting film 28 made of a 500 nm thick PSG sub-layer and a 100 nm thick $SiO_2$ sub-layer according to a low pressure CVD procedure as shown in FIG. 13.

Figure 14:
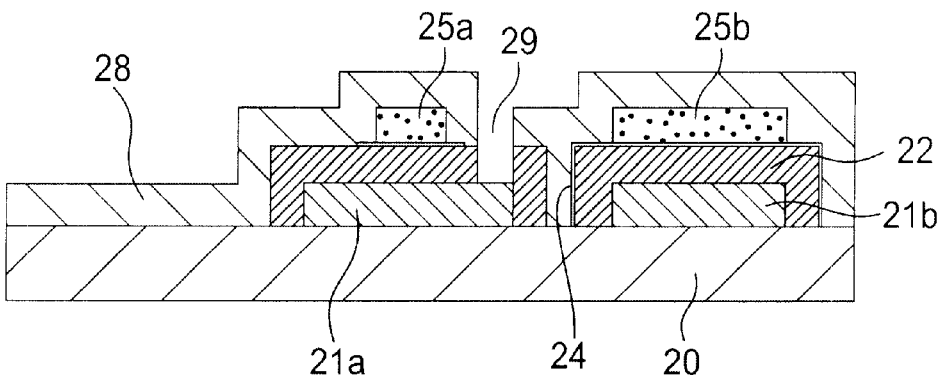

As shown in FIG. 14, The $SiO_2$ internal insulating film 28 and the $SiO_2$ gate insulating film 22 are partially wet etched using an $HF/NH_4F$ etchant to form a first contact hole 29 as a terminal for source or drain.

Figure 15:
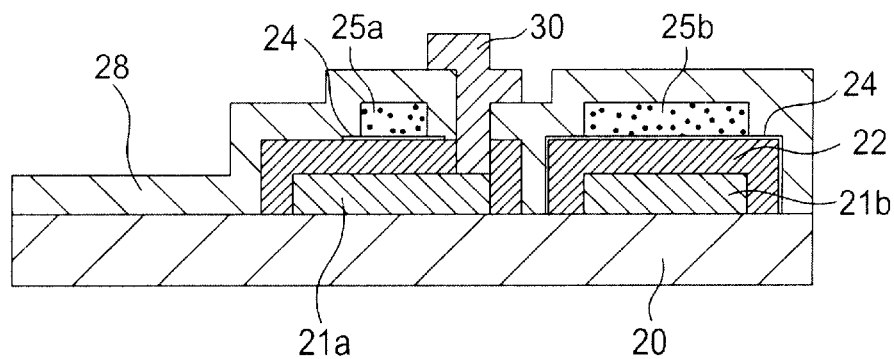

An Al/Si film is formed over the entire surface by sputtering in a thickness of 600 nm, after which as shown in FIG. 15, wet etching is effected using an etchant of $H_3PO_4/H_2O=2/10$, followed by patterning of the Al/Si film to form an Al/Si electrode 30.

Figure 16:
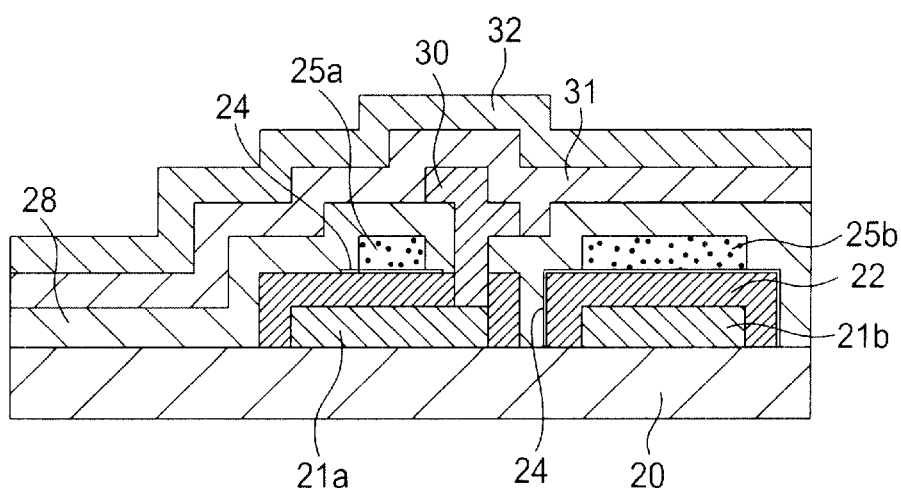

As shown in FIG. 16, a PSG passivation film 31 is formed by a low pressure CVD procedure in a thickness of 400 nm, followed by a SiN passivation film 32 made of SiN according to a PCVD procedure. Thereafter, annealing with hydrogen is effected in a reductive atmosphere of hydrogen ($H_2$) diluted with Ar at about 400° C. for 30 minutes.

Figure 17:
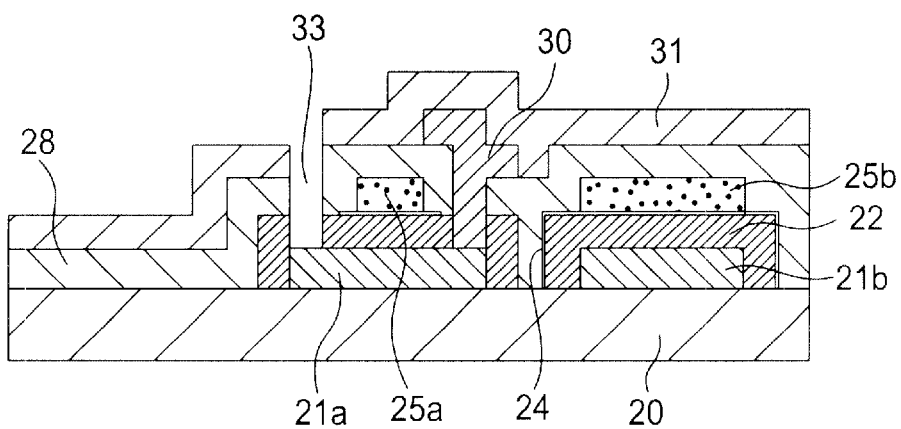

As shown in FIG. 17, the entire SiN passivation film 32 is plasma etched using an etching gas of $CF_4/O_2$ of 95/5, followed by wet etching with an etchant of $HF/NH_4F$ to form a second contact hole for a terminal of source or drain which arrives at the first polysilicon region 21a.

Figure 18:
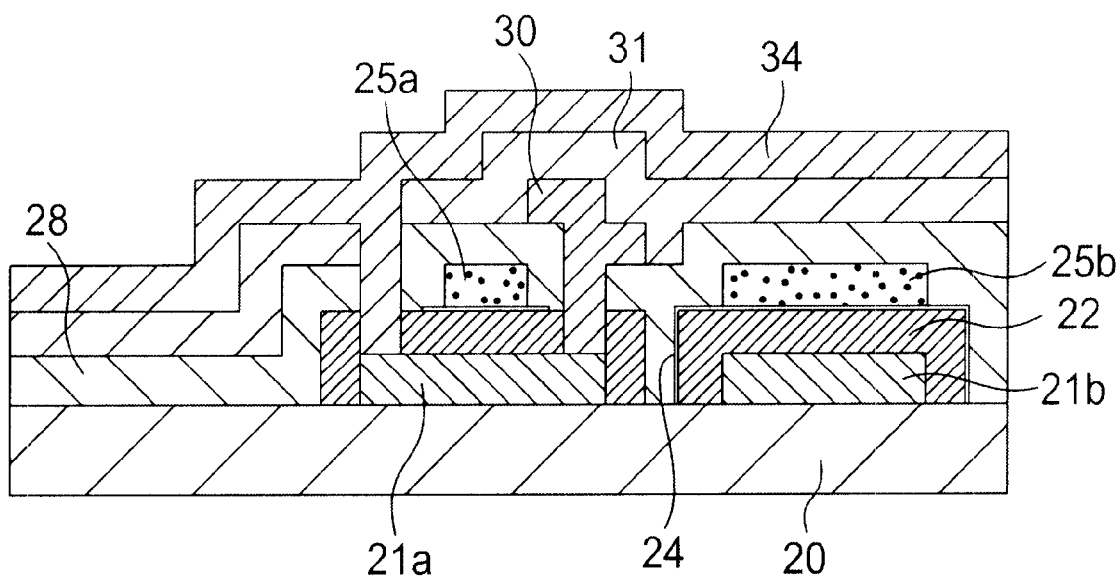

In FIG. 18, an ITO (indium tin oxide) film 34 is entirely formed over the surface by sputtering at a temperature of 400° C.

Figure 19:
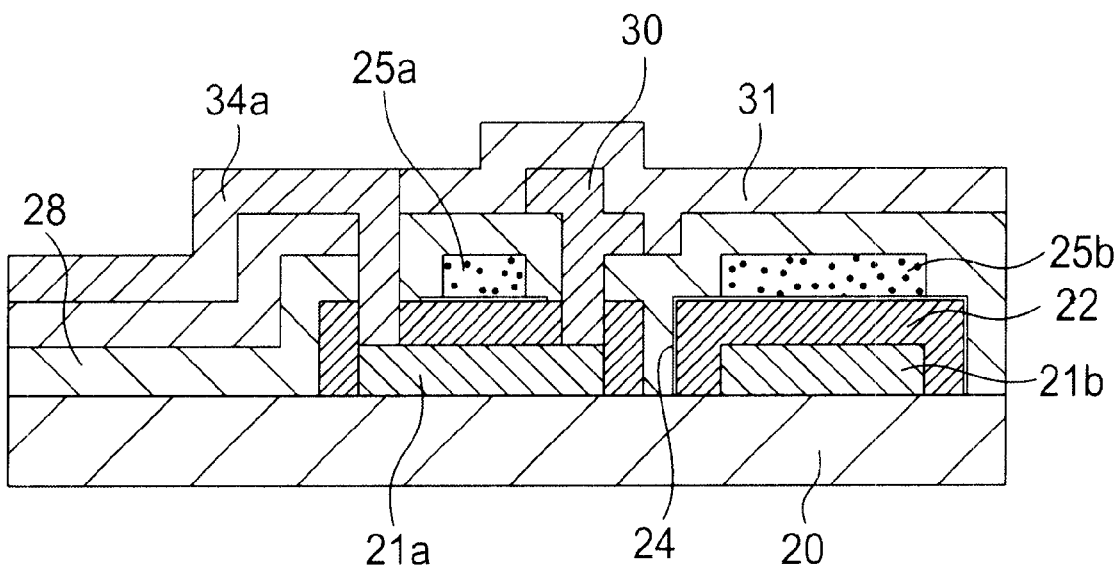

In FIG. 19, the ITO film 34 is subjected to patterning by the use of an etchant made of $HCl:H_2O:NO_3=300:300:50$ to form an ITO picture element electrode 34a.

Figure 20:
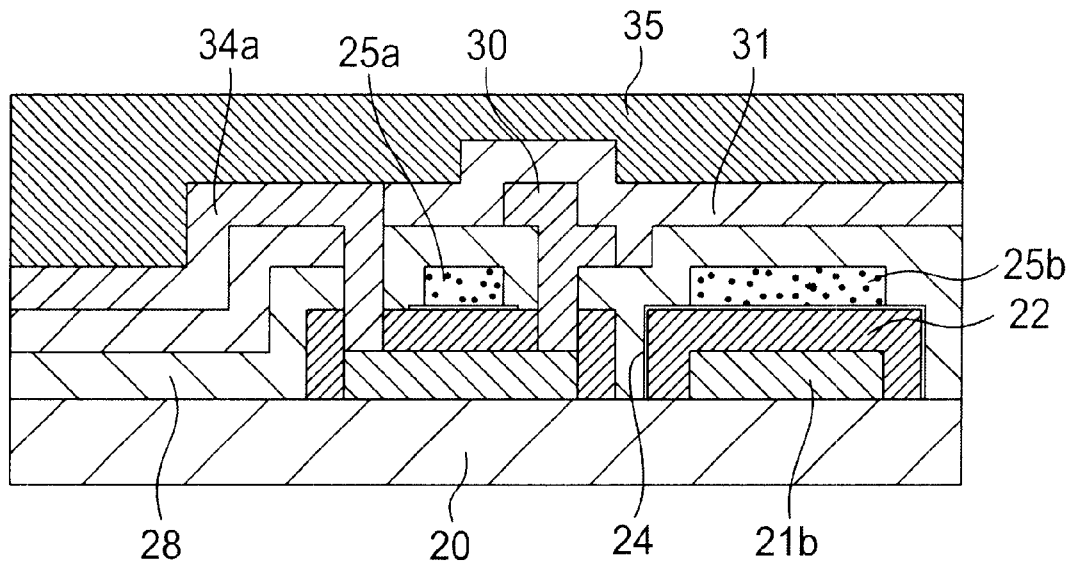
Figure 21:
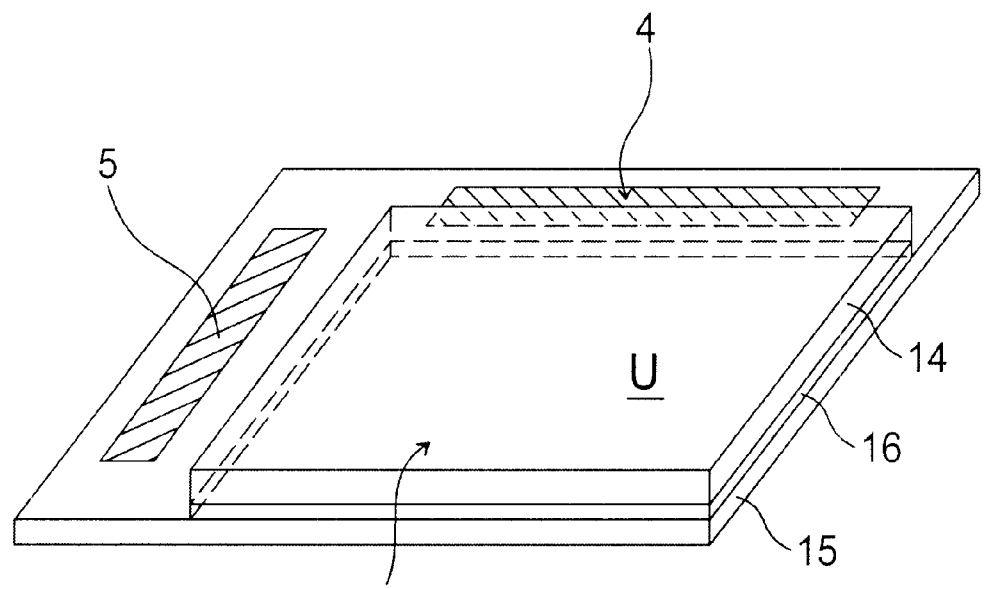
FIG. 21 is a schematic perspective view of a known liquid crystal display device.

Finally, as shown in FIG. 20, the exposed surfaces, i.e. the surfaces of the PSG passivation film 31 and the ITO picture element electrode 34a, are formed with a polyimide (PI) film 35 to obtain an active matrix substrate.

The liquid crystal display device of the invention can be readily obtained by disposing a liquid crystal layer between an upper substrate and the active matrix substrate obtained above by any ordinary procedure.

According to one embodiment of the invention, the active matrix substrate has the liquid crystal display unit made of the picture element electrode 13 and the thin film transistor, the scanning line drive circuit 4 and the signal line drive circuit 5 formed thereon. Since the upper substrate 2 is formed as opposing entirely to the active matrix substrate and the liquid crystal display unit is protected with the silicon oxide-based internal insulating film and the liquid crystal layer, the formation step of the protective layer for the transistor can be simplified. In addition, any SiN protective layer is not used, so that transistor characteristics such as $V_{TH}$, are not degraded owing to the film stress left in the SiN film.

The silicon oxide-based insulating film should preferably be made of PSG (phosphorus silicate glass), BSG (boron silicate glass), $SiO_2$ (silicon dioxide), SiN, SiON, SiONP or the like. When these insulating materials are used, organic adhesives may be used at the time of the formation of the liquid crystal cell with satisfactory adhesion strength being ensured.

In the first embodiment, the silicon nitride film is completely removed in the fabrication process. The complete removal of the silicon nitride film is advantageous as stated hereinabove. However, there may be some possibility that the hydrogen atoms diffused in the polysilicon thin film may be released owing to the stress which has been imparted after the hydrogenation treatment. This eventually leads, more or less, to degradation of electric characteristics of the transistors. The stresses may include ashing of the photoresist, plasma damages produced during the formation of the contact hole and thermal damages generated during annealing of the picture element electrode. In addition, breakage of metallic wirings may occur due to the use of etchants during the fabrication process.

In order to avoid these defects and further improve the reliability of the liquid crystal display device, there is provided a second embodiment of the invention wherein the silicon nitride is left selectively on the thin film transistors.

The second embodiment of the invention is particularly described with reference to FIGS. 22 to 25.

Figure 22A:
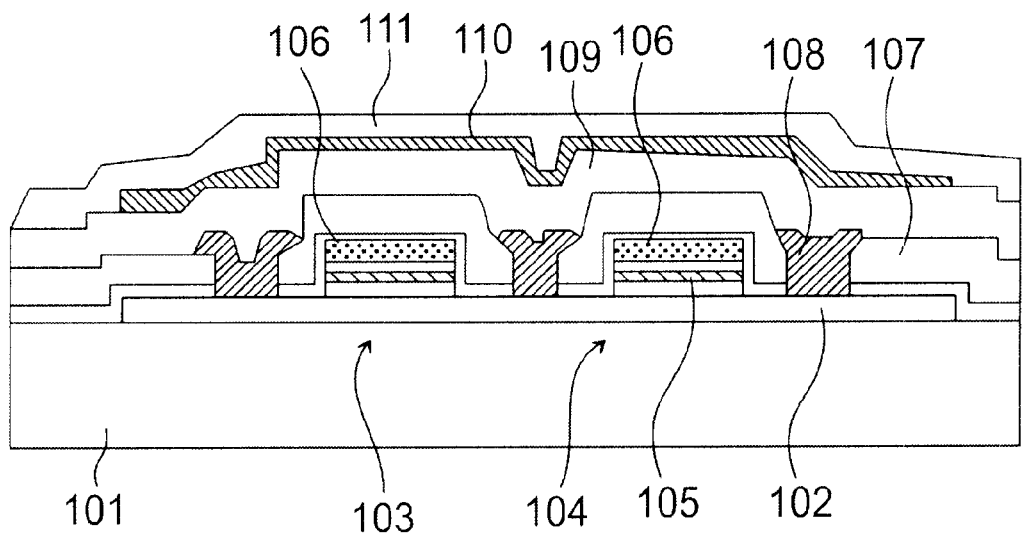
FIGS. 22a and 22b are, respectively, schematic sectional view showing a structure of an active matrix substrate to be assembled in a liquid crystal device of the invention.
Figure 22B:
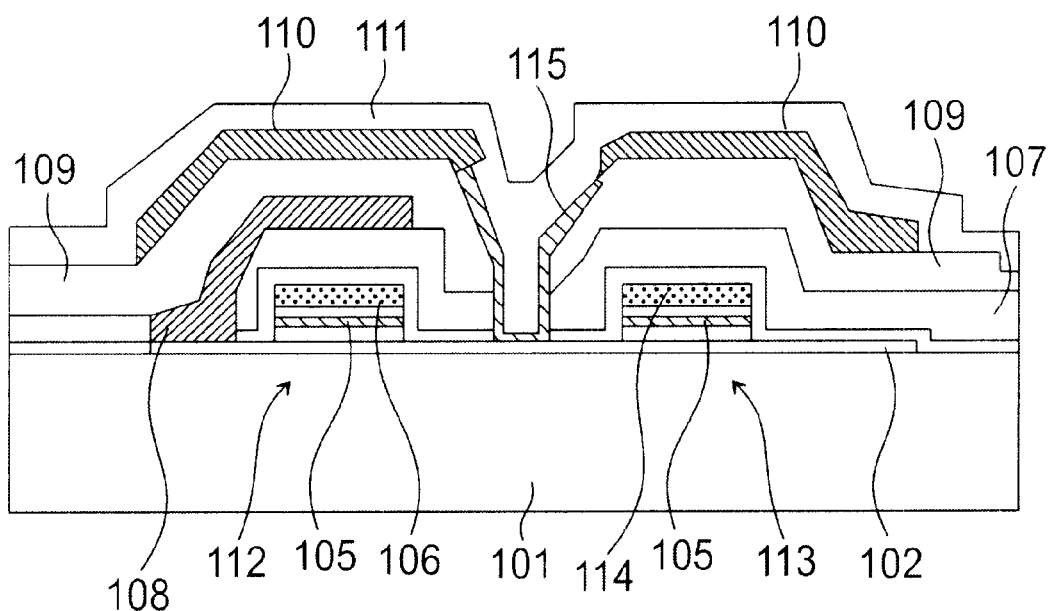

FIGS. 22a and 22b, respectively, show a peripheral circuit region and a picture element region similar to FIGS. 2a and 2b illustrating the first embodiment.

As shown in FIG. 22a, there is shown a lower substrate 101 which includes a patterned first polysilicon film 2, with which a thin film transistor is made. In this instance, the transistor has a CMOS structure contained in a peripheral circuit such as, for example, a horizontal drive circuit or a vertical drive circuit. The CMOS structure is comprised of a N-channel thin film transistor 103 and a P-channel thin film transistor 104. The respective transistors include a gate insulating film 105 with a three-layer structure and a gate electrode 106 formed on the gate insulating film 105. The gate electrode 106 is made of a patterned second polysilicon film. The gate insulating film 105 has a three-layer structure, for example, of $SiO_2/SiN/SiO_2$. These transistors 103, 104 have an internal insulating film 107, e.g. PSG, covered on the surface thereof. On the internal insulating film 107 is formed a metal wiring 108 in a pattern, which is connected to source and drain regions of each transistor through contact holes formed in the internal insulating film 107. A passivation film 9 made, for example, of PSG is entirely formed to cover the metal wiring 108. Further, a silicon nitride protective film 110 is formed over the passivation film 109. Finally, an orientation film 110 made, for example, of polyimide is formed to cover the entire surface.

The silicon nitride protective film 110 is entirely formed prior to hydrogenation. After completion of the hydrogenation, the film 110 is patterned in a desired form to allow the silicon nitride film to be left on the transistors 103, 104 and the metal wiring 108. It is preferred that the silicon nitride film 110 is left on a region containing at least the patterned first polysilicon film 102.

FIG. 22b shows a display unit of an active matrix substrate. In FIGS. 22a and 22b, like reference numerals indicate like parts or members. The lower substrate 101 has an N-channel picture element transistor 112 and a storage capacitor 113 as shown. On the insulating film 107 is formed an electrical connecting layer 108 in a desired pattern. Pt, Al, Al—Si, Pd, Au, Ag, Mo, MoSi, Cr, NiCr, ITO, Ta, Ti, W, polysilicon, or the like could be used as the electrical connecting layer. The electrical connecting layer 108 is connected to a source region of the picture element transistor 112 to form a signal line. It will be noted that a second polysilicon film 114 of the storage capacitor 113 is made of a material as of the gate electrode 106 of the picture element transistor 112. The metal wiring 108 is covered with the passivation film 109 made of PSG, on which a picture element electrode 115 made, for example, of ITO is formed. The picture element electrode 115 is connected to a drain region of the picture element transistor through a contact hole as shown. The passivation film 9 has a selectively patterned silicon nitride protective film 110 thereon. This silicon nitride protective film 110 not only covers the picture element transistor 112, but also the metal wiring 108 used as the signal line. The silicon nitride protective film 110 is formed over the entire surface prior to hydrogenation and subsequently selectively etched.

Figure 23:
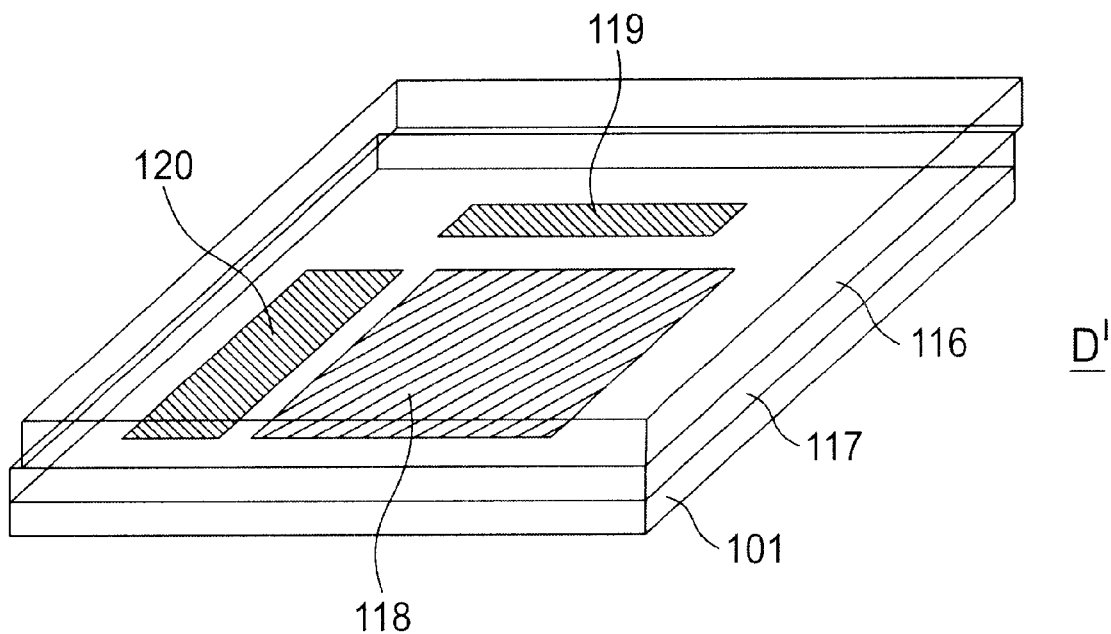
FIG. 23 is a schematic perspective view of a liquid crystal display device according to another embodiment of the invention.

FIG. 23 is similar to FIG. 1 and schematically shows an assembled liquid crystal display device using the active matrix substrate of FIG. 22. A liquid crystal panel or cell device D' has a structure which includes a lower substrate 101 and an upper substrate 116 bonded through a spacer 117 and has a liquid crystal therein. The lower substrate 101 has thereon a display unit 118 and peripheral circuits such as a horizontal drive circuit 119 and a vertical drive circuit 120. The silicon nitride film covers only the thin film transistors and the metal wirings contained in the display unit 118 and the horizontal and vertical drive circuits 119, 120. Eventually, the passivation film made of PSG is exposed around the periphery of the lower substrate 101. This is why the adhesion strength between the lower substrate 101 and the upper substrate 116 is kept high. Accordingly, aside from the display unit 118, the horizontal and vertical drive circuits 119, 120 can be included in the liquid crystal cell, so that the fabrication process can be simplified with improved reliability. It will be noted that although not shown, a counter electrode is formed on the inner surface of the upper substrate 116.

Figure 24:
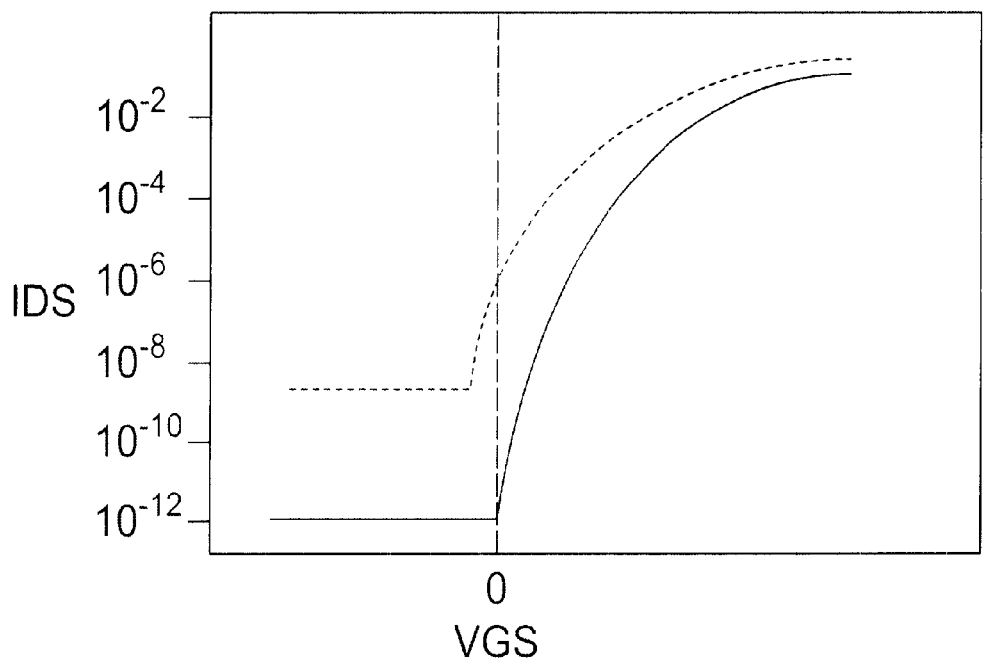
FIGS. 24 and 25 are, respectively, a graph showing an electric characteristic of a thin film transistor formed on the active matrix substrate as shown in FIG. 22.

FIG. 24 is a graph showing the relation between drain current (IDS) and the gate voltage (VSG) of the thin film transistor. The characteristic shown is one after the transistor has been thermally damaged. In the figure, the solid line indicates a case where the transistor is locally or selectively covered with the silicon nitride film and the dotted line indicates a case where not covered. As will be clearly seen from the graph, when the transistor is covered with the silicon nitride protective layer, the transistor characteristic is not varied after receiving the thermal damage. In contrast, when any silicon nitride protective layer is not used, the leakage current is increased. This is considered for the reason that release of the hydrogen atom proceeds by the influence of the thermal damage and the trap density in the first polysilicon film increases. The characteristic is determined by setting a potential, VDS, between the source and drain at 10 V and using a thin film transistor having a channel length of 5 µm and a channel width of 3 µm.

Figure 25:
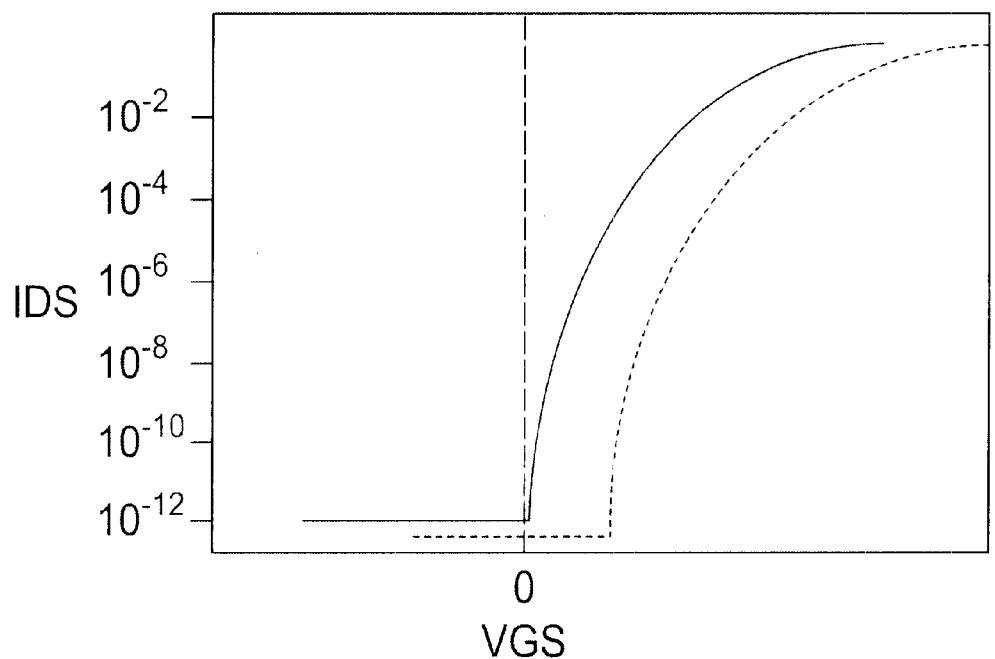

FIG. 25 shows a gate voltage-drain current characteristic of the transistor after application of a plasma damage. As indicated by the solid line, when the transistor is covered with the silicon nitride protective film, little characteristic variation is recognized. In contrast, when the transistor is not covered, the threshold voltage is shifted as shown by the dotted line. This is considered for the reason that the hydrogen atom bonded at the interfacial level between the first polysilicon film and the gate oxide film is released.

In the following table, the probability of occurrence of metal wiring breakage as will be produced by the attack of etchants is shown.

TABLE

| | Sample A having no silicon nitride layer on a metal wiring | Sample B of Second embodiment having silicon nitride layer on a metal wiring |
|---|---|---|
| Type A | 20% | 0% |
| Type B | 30% | 0% |
| Type C | 34% | 0% |

In the above table, the samples B of the second embodiment are those wherein the metal wiring such as Al is covered with a silicon nitride protective layer. The samples A are those wherein the silicon nitride protective layer is entirely removed. Three types A, B and C of active matrix liquid crystal display devices are used for the respective samples. In this test, the width of the aluminum wiring is set at 4 µm and the breakage of the wiring at a portion extending over the second polysilicon film is electrically detected. As will be apparent from the Table, the samples of the second embodiment has no breakage failure.

The fabrication process of the active matrix substrate according to the second embodiment of the invention is particularly described with reference to FIGS. 26 to 48. It will be noted that the fabrication process is directed only to the display unit, and peripheral circuits can be fabricated in the same way as this fabrication process.

Figure 26:
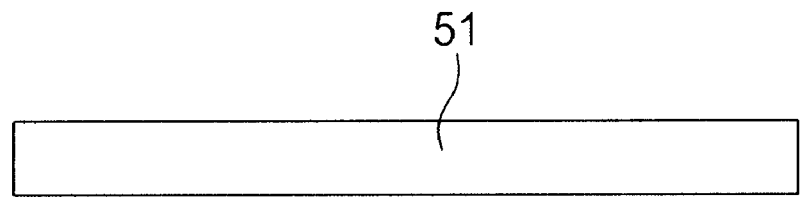
FIGS. 26 to 48 are schematic views showing a fabrication sequence of the liquid crystal display device of FIG. 23 according to the invention.
Figure 27:
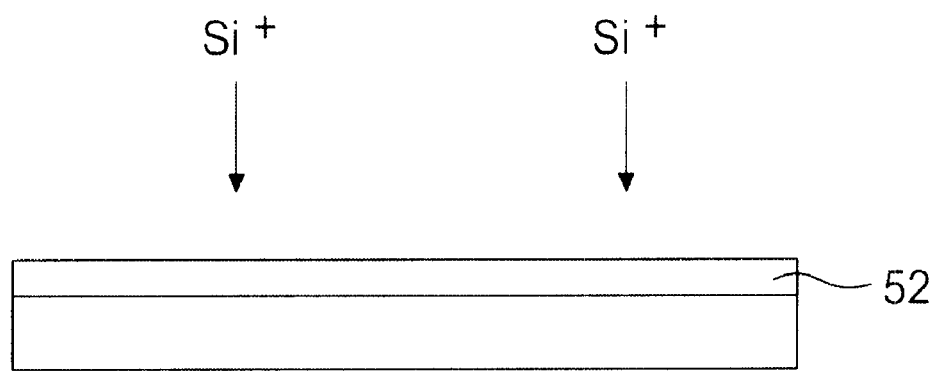
Figure 28:
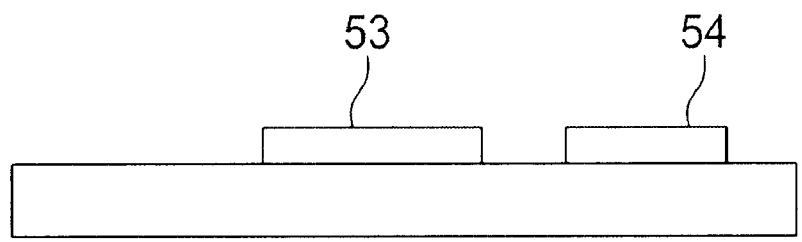

The formation step of the first polysilicon film is described with reference to FIGS. 26 to 28.

Initially, there is provided a lower substrate 51 made, for example, of quartz glass. Then, a first polysilicon film 52 is deposited on the substrate 51 in a thickness of 800 angstroms according to the LPCVD procedure. $Si^+$ ions are implanted as shown in FIG. 27. The ion implantation is effected at an acceleration energy of 30 KeV at a dose of $1\times10^{15}/cm^2$. The ion implantation is continued while raising the acceleration energy to 50 KeV at a dose of $1\times10^{15}/cm^2$. Thereafter, annealing at 620° C. is effected so that solid phase growth in the polysilicon film 52 is promoted. The first polysilicon film is subjected to patterning to form a transistor active region 53 and a capacitor region 54 as shown in FIG. 28.

Figure 29:
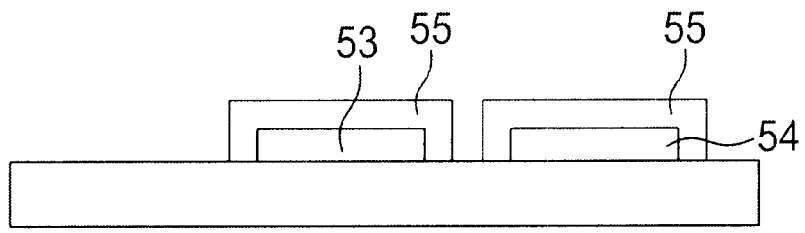
Figure 30:
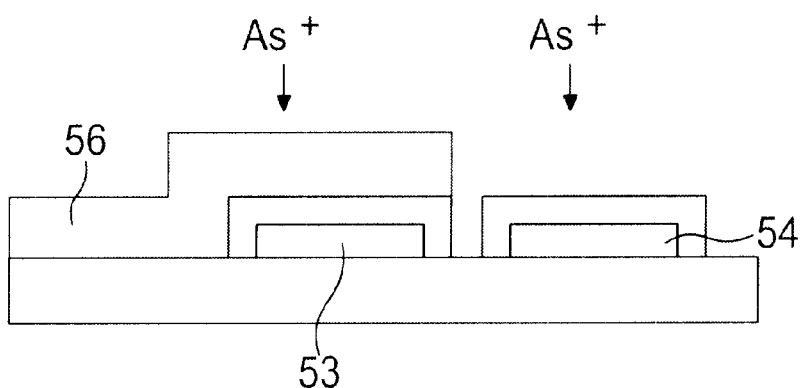
Figure 31:
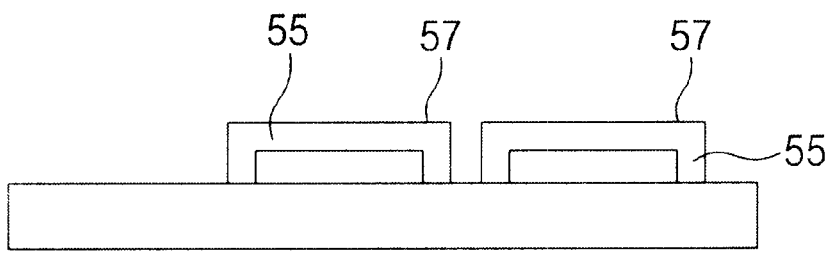

Formation of a gate insulating film is described with reference to FIGS. 29 to 31.

The first polysilicon film of the active region 53 and the capacitor region 54 is thermally oxidized to form 500 angstrom thick film silicon dioxide film 55. Subsequently, the active region 53 is masked with a photoresist 56, after which $As^+$ ions are selectively implanted to render the capacitor region 54 alone small in resistance. The ion implantation is effected at an acceleration energy of 30 KeV and at a dose of $5\times10^{14}/cm^2$. After removal of the mask, the thermally oxidized films 55 are subjected to the LPCVD procedure to form a 200 angstrom thick SiN gate insulating film 57 as shown in FIG. 31. Thus, a built-up gate insulating films are obtained.

Formation of a second polysilicon film is described with reference to FIGS. 32 and 33.

Figure 32:
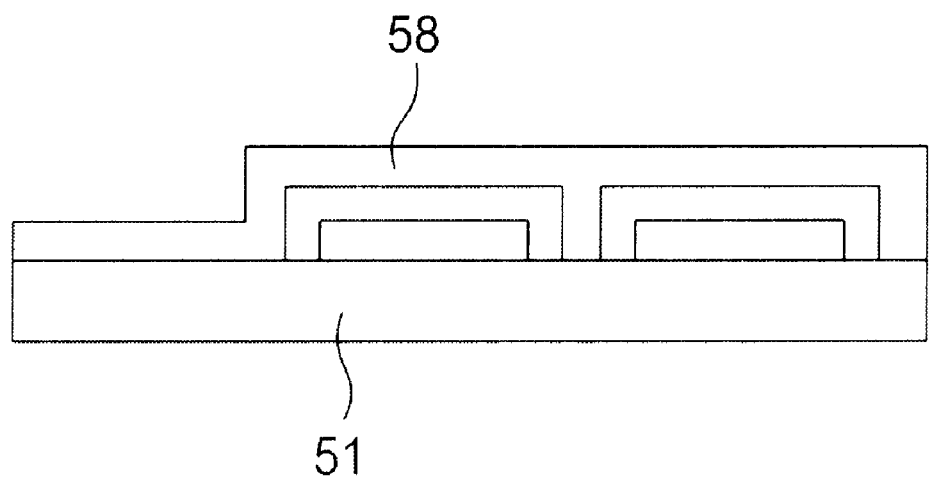
Figure 33:
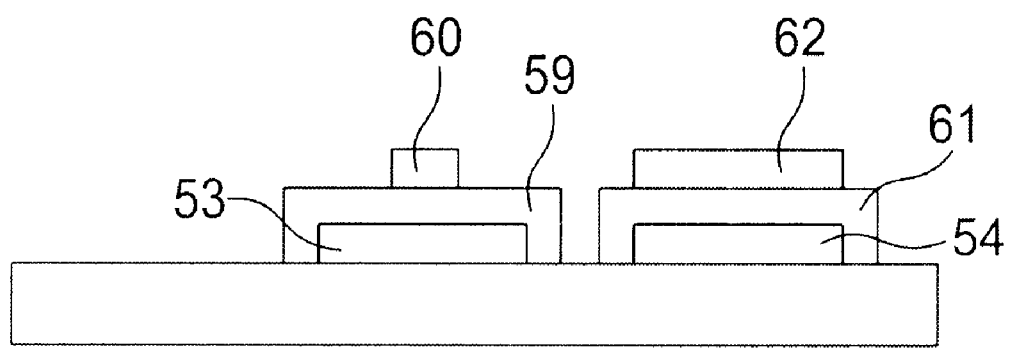

A second polysilicon film 58 is formed on the entire upper surface of the lower substrate 51 in a thickness of 3500 angstroms according to the LPCVD procedure as shown in FIG. 32. A PSG film (not shown) is then deposited over the film 58, followed by annealing at 1000° C. to diffuse phosphorus, thereby rendering the second polysilicon film small in resistance. Thereafter, the PSG film is removed, after which the second polysilicon film is patterned in a desired form as shown in FIG. 33. A gate electrode 60 is formed on the active region 53 through a gate insulating film 59 and a storage capacitor electrode 62 is formed on the capacitor region 54 through a dielectric film 61. The gate insulating film 59 and the dielectric film 61 are made of the same composition and are constituted of a built-up structure consisting of the oxide film 55 and the nitride film 57. The patterning of the second polysilicon film is effected by plasma etching with a mixed gas of $CF_4/O_2=95/5$.

Figure 34:
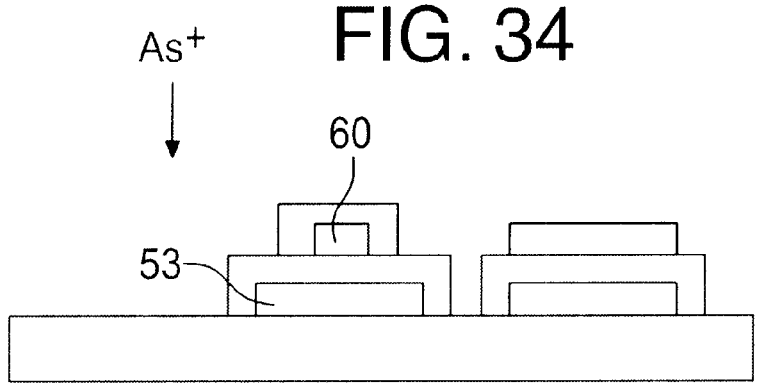
Figure 35:
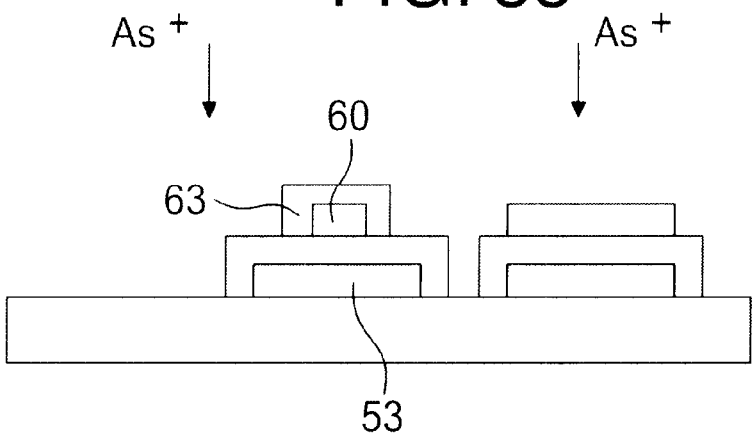
Figure 36:
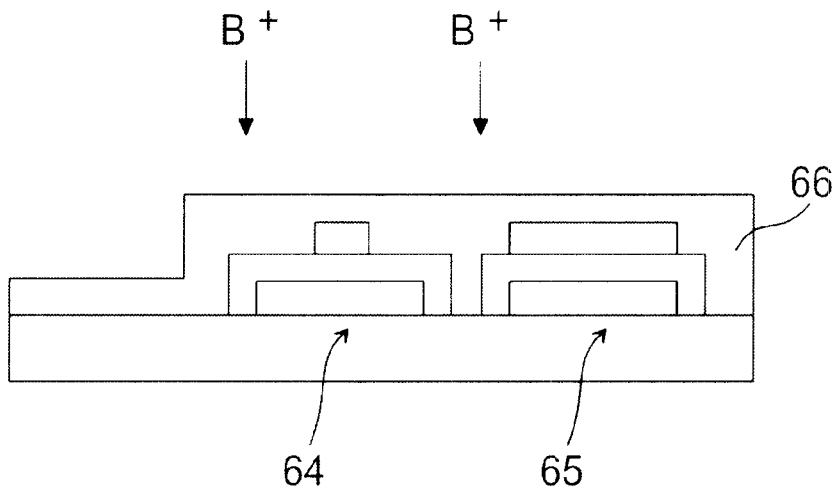
Figure 37:
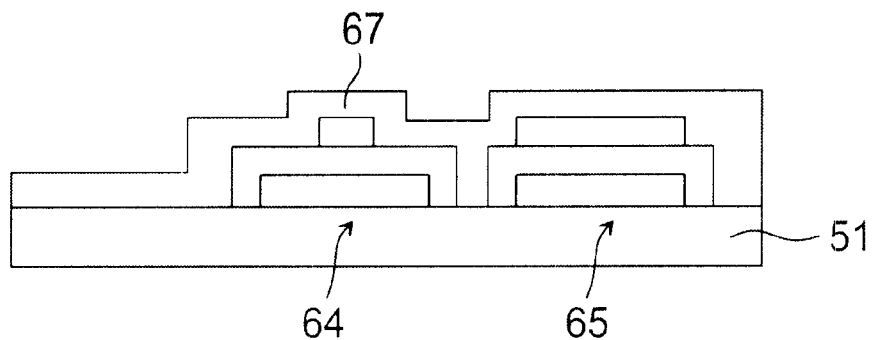

FIGS. 34 to 36 show formation of a transistor channel region. The gate electrode 60 is masked and $As^+$ ions are self-alignedly implanted to form a LDD region. The ion implantation is effected at an acceleration energy of 160 KeV and at a dose of $1\times10^{13}/cm^2$. After formation of an oxide film on the upper and side surfaces of the gate electrode 60, $As^+$ ions are self-alignedly implanted into the active region 53 to form an N-channel region. The ion implantation is effected at an acceleration of 140 KeV and at a dose of $2\times10^{15}/cm^2$. Subsequently, $B^+$ ions are implanted as shown in FIG. 36 thereby separately forming a P-channel region. The ion implantation is effected at an acceleration energy of 30 KeV and at a dose of $2\times10^{15}/cm^2$. When the P-channel region is formed, the N-channel transistor 64 and the storage capacitor 65 are masked with a photoresist 66 as shown.

FIGS. 37 to 40 show formation of a metal wiring.

Figure 38:
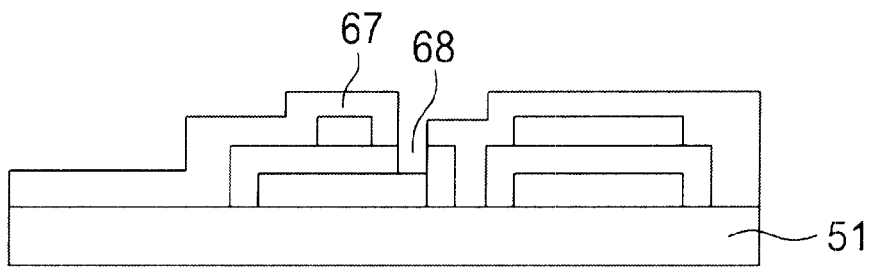
Figure 39:
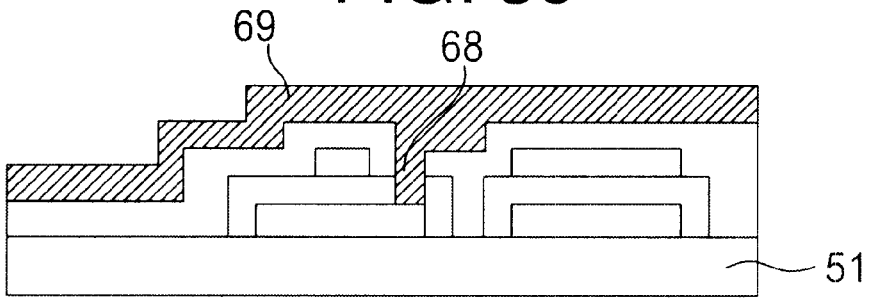
Figure 40:
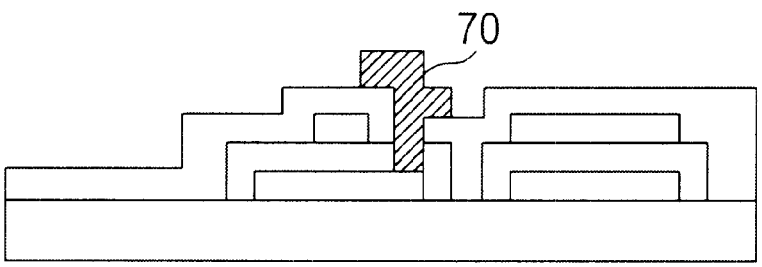

An internal insulating film 67 is deposited entirely on the surface of the quartz substrate 51 to cover the picture element transistor 64 and the storage capacitor 65 therewith. The internal insulating film 67 has a double-layer structure which is formed by depositing a 5000 angstrom thick PSG layer and then a 1000 angstrom thick $SiO_2$ layer each according to the LPCVD procedure. Subsequently, the insulating layer 67 is selectively etched to form a first contact hole 68 communicating with the source of the transistor 64 as shown in FIG. 38. To this end, wet etching is effected using a mixed solution of $HF/NH_4F$. An Al/Si film is formed by sputtering over the quartz substrate 51 in a thickness of 6000 angstroms to fill the first contact hole 68 therewith as shown in FIG. 39. The Al/Si film 69 is made of metallic aluminum to which 0.5% of silicon is added. Finally, the Al/Si film is patterned in a desired form to provide a metal wiring 70 as shown in FIG. 40. The patterning is effected by wet etching using a mixed solution of $H_3PO_4/H_2O=2/10$.

Figure 41:
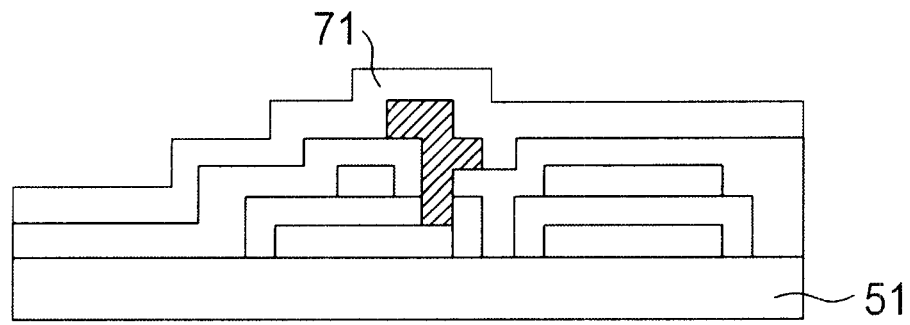
Figure 42:
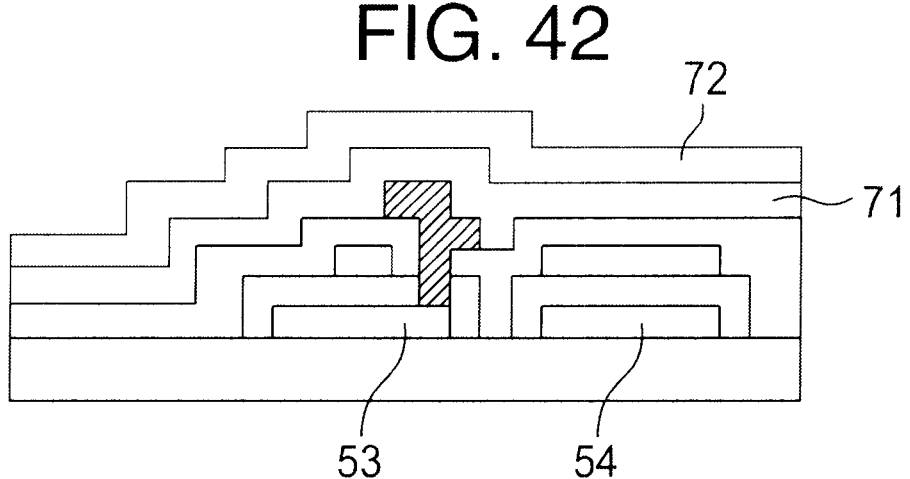
Figure 43:
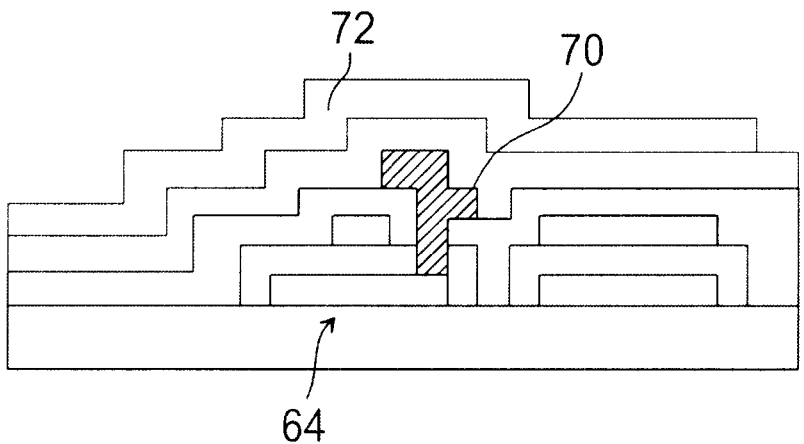

FIGS. 41 to 43 shows formation of a protective film.

A passivation film 71 made, for example, of PSG is formed entirely over the quartz substrate 51 in a thickness of 400 angstroms according to the LPCVD procedure as shown in FIG. 41. Then, a silicon nitride protective film 72 is entirely deposited over the film 71 according to the PCVD procedure in a thickness of 4000 angstroms, followed by annealing at approximately 400° C. As a consequence, the hydrogen atoms contained in the silicon nitride film 72 is diffused into the active region 53 and the capacitor region 54. This is a so-called hydrogenation treatment. As a atomic hydrogen source, there may be used other types of plasma-deposited layers such as p-$SiO_2$, p-SiON, p-PSG, p-SiONP and the like.

Finally, the silicon nitride film 72 is wet etched so that the picture element transistor 64 and the metal wiring 70 are covered therewith. The wet etching is effected using a mixed solution of $CF_4/O_2=95/5$. The film 72 may be a plasma-deposited film composed of SiO, SiN or SiON.

Figure 44:
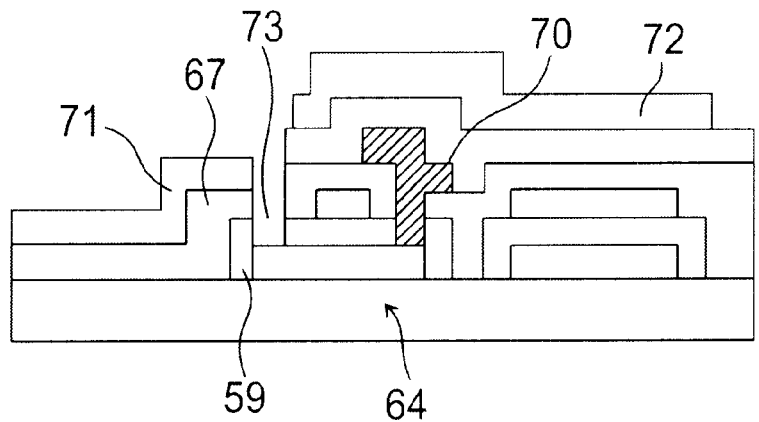
Figure 45:
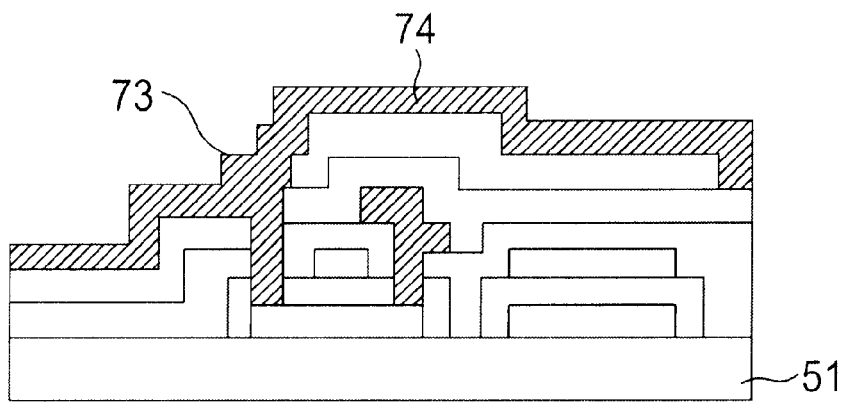
Figure 46:
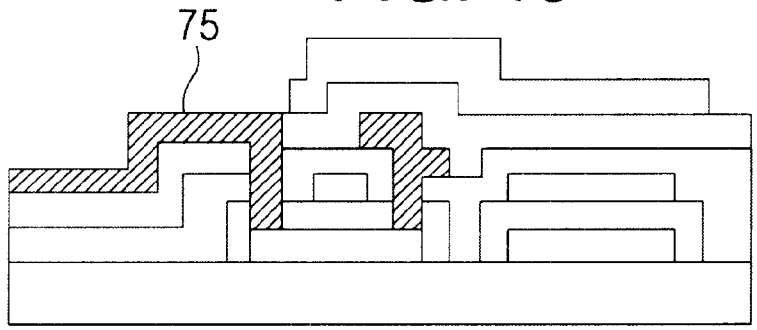

FIGS. 44 to 46 show formation of a picture element electrode. The PSG passivation film 71, internal insulating film 67 and gate insulating film 59 are selectively etched as shown in FIG. 44, thereby forming a second contact hole 73. This is effected by wet etching using a mixed solution of $HF/NH_4F$. Since the metal wiring 70 is covered with the silicon nitride protective film 72, it does not suffer corrosion with the etching solution. The thus formed second contact hole 7f3 communicates with the drain region of the picture element transistor 64. Thereafter, a transparent conductive film 74 such as, for example ITO is formed on the quartz substrate 51 in a thickness of 1400 angstroms as shown in FIG. 45. The second contact hole 72 is filled with the conductive film material. Finally, the transparent conductive film is patterned in a desired form to form a picture element electrode 75. The patterning is effected by wet etching using a mixed solution of $HCl:H_2O:NO_3=300:300:50$.

Figure 47:
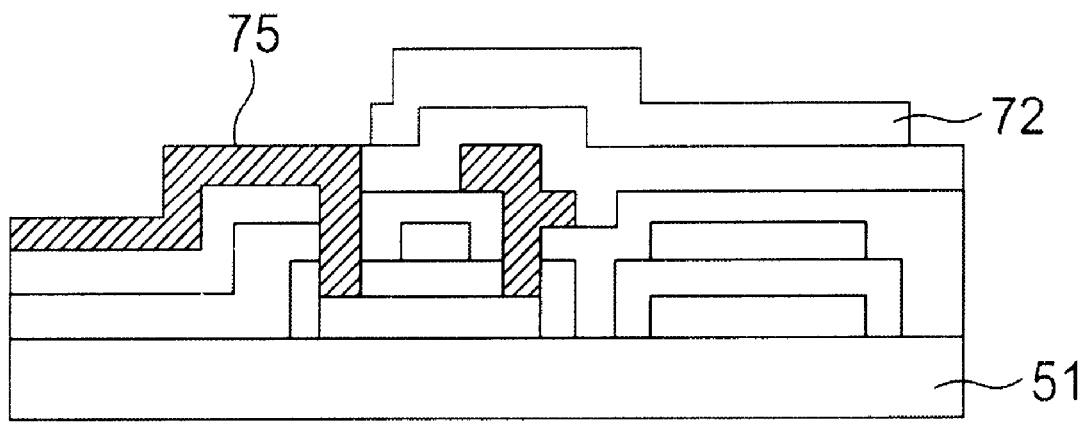
Figure 48:
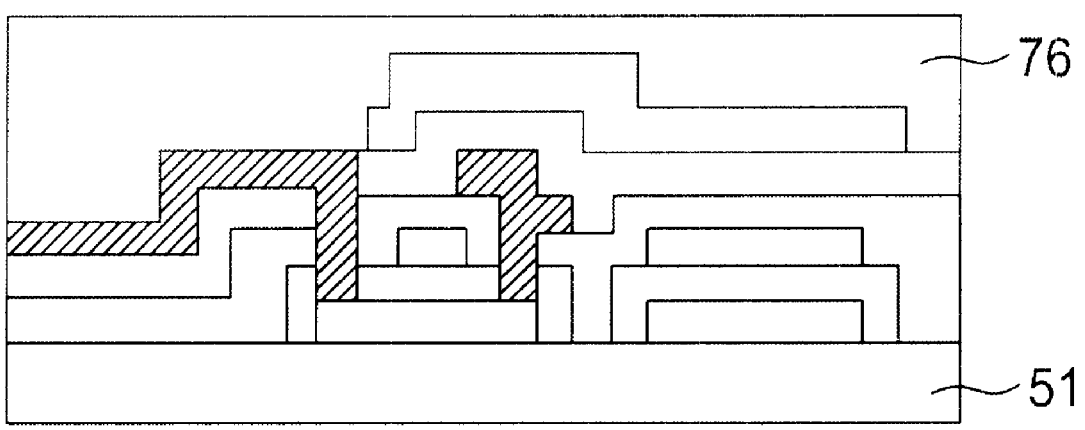

FIGS. 47 and 48 show an annealing treatment. The picture element electrode 75 made of ITO is thermally treated in an atmosphere of hydrogen gas diluted with argon gas at 400° C. for 3 hours, thereby rendering the electrode 75 low in resistance. At this time, hydrogen atoms are diffused from the silicon nitride film 72, ensuring reliable hydrogenation treatment. In this embodiment, the silicon nitride film 72 is partially left, so that hydrogen atoms which have been diffused is suppressed from release. Finally, the substrate 51 is entirely covered with an orientation film 76 made of a polyimide resin and rapped to complete an active matrix substrate.

In this embodiment, the peripheral circuits are located within a liquid crystal cell and the silicon nitride protective film is selectively left on the upper surface of the thin film transistor and the metal wiring. Accordingly, the thin film transistor made of the polysilicon can be sufficiently hydrogenated and the separation of hydrogen atoms can be suppressed. Thus, the transistor characteristics are prevented from degradation. The metal wiring is prevented from breakage through corrosion, ensuring long-term stability of the transistor. In addition, the silicon nitride film is selectively remove, residual stress of the silicon nitride film can be mitigated. Adhesion strength between the upper and lower substrates is ensured through the exposed passivation film.

What is claimed is:

1. A process of forming an active matrix substrate comprising:

forming thin film transistors on a substrate, the thin film transistors having polysilicon thin film regions;

forming first metal wiring on the substrate coupled to the thin film transistors;

subsequently forming a first passivation layer over the thin film transistors;

forming a second passivation layer on the first passivation layer;

annealing with hydrogen to hydrogenate the polysilicon thin film regions of the thin film transistors;

removing the second passivation layer; and forming a polymide film over the first passivation layer.

2. The process of claim 1, wherein forming a second passivation layer comprises forming a Silicon Nitride passivation layer.

3. The process of claim 1, wherein:

forming the first passivation layer further comprises forming the first passivation layer over the thin film transistors and the first metal wiring; and removing the second passivation layer comprises selectively etching the second passivation layer to expose a portion of the substrate for substantially adhering the substrate to an opposing substrate.

4. The process of claim 3, wherein removing the second passivation layer comprises selectively etching the second passivation layer to expose a portion of at least one of the polysilicon thin film regions of the thin film transistors while the first metal wiring remains covered by the second passivation layer.

5. The process of claim 4, further comprises the steps of:

forming a second metal wiring over the substrate and coupled to the portion of the at least one polysilicon region; and annealing with hydrogen to reduce the resistance of the second metal wiring and to further hydrogenate the polysilicon thin film regions of the thin film transistors.

6. The process of claim 5, wherein the second passivation layer covers the thin film transistors other than the portion of the at least one polysilicon region such that hydrogen depletion from the polysilicon regions of the thin film transistors is substantially inhibited.

7. The process of claim 1, further comprising forming a liquid crystal display device by disposing a liquid crystal layer between the substrate and an opposing upper substrate.

8. The process of claim 1, wherein the first passivation layer is comprised of a material other than silicon nitride.

9. The process of claim 1, wherein a first portion of the thin film transistors are vertical drive thin film transistors, and a second portion of the thin film transistors are horizontal drive thin film transistors, and a third portion of the thin film transistors are picture switching thin film transistors.

* * * * *